(12) United States Patent
Iyer

(10) Patent No.: US 9,194,710 B1
(45) Date of Patent: Nov. 24, 2015

(54) PARKED CAR LOCATION

(71) Applicant: Google Inc., Mountain View, CA (US)

(72) Inventor: Rakesh Narayan Iyer, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/313,378

(22) Filed: Jun. 24, 2014

(51) Int. Cl.
*G01C 21/26* (2006.01)

(52) U.S. Cl.
CPC ....................................... *G01C 21/26* (2013.01)

(58) Field of Classification Search
USPC ........................................................ 701/468
See application file for complete search history.

(56) References Cited

U.S. PATENT DOCUMENTS

| | | | |
|---|---|---|---|
| 6,407,698 B1 * | 6/2002 | Ayed | 342/357.31 |
| 6,529,142 B2 * | 3/2003 | Yeh et al. | 340/988 |
| 6,583,734 B2 * | 6/2003 | Bates et al. | 340/988 |
| 6,816,089 B2 * | 11/2004 | Flick | 340/989 |
| 7,885,758 B2 * | 2/2011 | Sutardja | 701/117 |
| 2011/0295503 A1 * | 12/2011 | Isert et al. | 701/214 |

\* cited by examiner

*Primary Examiner* — Thomas Tarcza
*Assistant Examiner* — Alex C Dunn
(74) *Attorney, Agent, or Firm* — Morris & Kamlay LLP

(57) ABSTRACT

A user may be provided with a representation of their vehicle on the user's mobile device. The vehicle's location may be determined based on one or more signals received from the mobile device and/or the motor vehicle. The device may generate a notification or otherwise store an indication of the motor vehicle's position. A representation of the motor vehicle's location may be provided to the user on the mobile device.

17 Claims, 4 Drawing Sheets

PARKED CAR LOCATION

BACKGROUND

Crowded locations, such as an airport or a sports venue, may accommodate a large number of vehicles in various parking structures or lots. In some cases, a vehicle may be parked on a street at a significant distance from the event the owner is attending and the owner may leave their vehicle parked for significant length of time. The owner may not remember the location at which the vehicle was parked due to unfamiliarity with the location or similarity of one parking structure or floor of the structure to another.

BRIEF SUMMARY

According to an implementation, a mobile device may receive one or more signals from the mobile device and/or a motor vehicle. The mobile device may be physically connected to the motor vehicle. The one or more signals may include a GPS signal, a disconnect signal, and a gear sensor. One or more events may be determined to have occurred including, but not limited to: the gear sensor indicates the motor vehicle is in park, the mobile device has been disconnected from the motor vehicle, and that a first GPS signal is substantially identical to a second GPS signal. The first GPS signal and the second GPS signal may form a vehicle position. A notification may be generated that indicates the vehicle position of the motor vehicle. The notification may be stored on a computer readable memory of the mobile device. The mobile device may be determined to have deviated from the vehicle position by a preset value. A third GPS signal may be received that is proximal position. The notification of the vehicle position may be presented based on the receipt of the third GPS signal.

A system is disclosed that includes a computer readable memory and a processor. The computer readable memory may store one or more signals from a mobile device and a motor vehicle. The mobile device may be physically connected to the motor vehicle. The one or more signals may include a GPS signal, a disconnect signal, and a gear sensor. The processor may be configured to receive, by the mobile device, the one or more signals from the mobile device and the motor vehicle. It may determine that one or more events have occurred. The events may include: the gear sensor indicating the motor vehicle is in park, the mobile device being disconnected from the motor vehicle, and a first GPS signal being substantially identical to a second GPS signal. The first GPS signal and the second GPS signal may form a vehicle position. The processor may generate a notification that indicates the vehicle position of the motor vehicle and store the notification on a computer readable memory of the mobile device. The processor may determine that the mobile device has deviated from the vehicle position by a preset value. The system may receive a third GPS signal that is proximal to vehicle position. The processor may present the notification of the vehicle position based on the receipt of the third GPS signal.

In an implementation, a system according to the presently disclosed subject matter includes a means for receiving, by a mobile device, one or more signals from the mobile device and/or a motor vehicle. The signals may include a GPS signal, a disconnect signal, and a gear sensor. The system may include a means for determining that one or more events have occurred. The events may include one or more of: the gear sensor indicating that the motor vehicle is in park, the mobile device being disconnected from the motor vehicle, and a first GPS signal is substantially identical to second GPS signal. The first GPS signal and the second GPS signal may form a vehicle position. The system may include a means for generating a notification that indicates that the vehicle position of the motor vehicle. The system may include a means for storing the notification on a computer readable memory of the mobile device. The system may include a means for determining that the mobile device has deviated from the vehicle position by a preset value. The system may include a means for receive a third GPS signal that is proximal to the vehicle position. The system may include a means for presenting the notification of the position based on the receipt of the third GPS signal.

As disclosed herein, a motor vehicle may be determined based on at least one of a first GPS signal and a disconnect signal. The first GPS signal and the disconnect signal may be received by a mobile device that was connected to the infotainment system of a motor vehicle. A position of the motor vehicle may be determined based on the first GPS signal. Based on a second GPS signal, it may be determined that the mobile device is a threshold distance away from the position of the motor vehicle at a first time reference. An indication of the position of the motor vehicle may be stored. Based on a third GPS signal, it may be determined that the mobile device is proximal to the position of the motor vehicle at a second time reference. A representation of the position of the motor vehicle relative to the mobile device may be provided based on the first GPS signal and the third GPS signal.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

As disclosed herein, a computing device connected to a motor vehicle may receive an indication that a user has parked the vehicle. The computing device may generate a notification for the user that describes or otherwise provides an indication of the location at which the user parked. The notification may be viewable by the user at any time subsequent to its generation and, likewise, may be displayed on the computing device at preset intervals or until dismissed by the user. The notification may appear in response to a triggering event such as when the user returns to the general location at which the car is parked. The notification may be sent to other devices associated with the user or to other accounts associated with the user. For example, if the notification may be sent to the user by text, email, or as an application notice in a smartphone.

Figure 1:
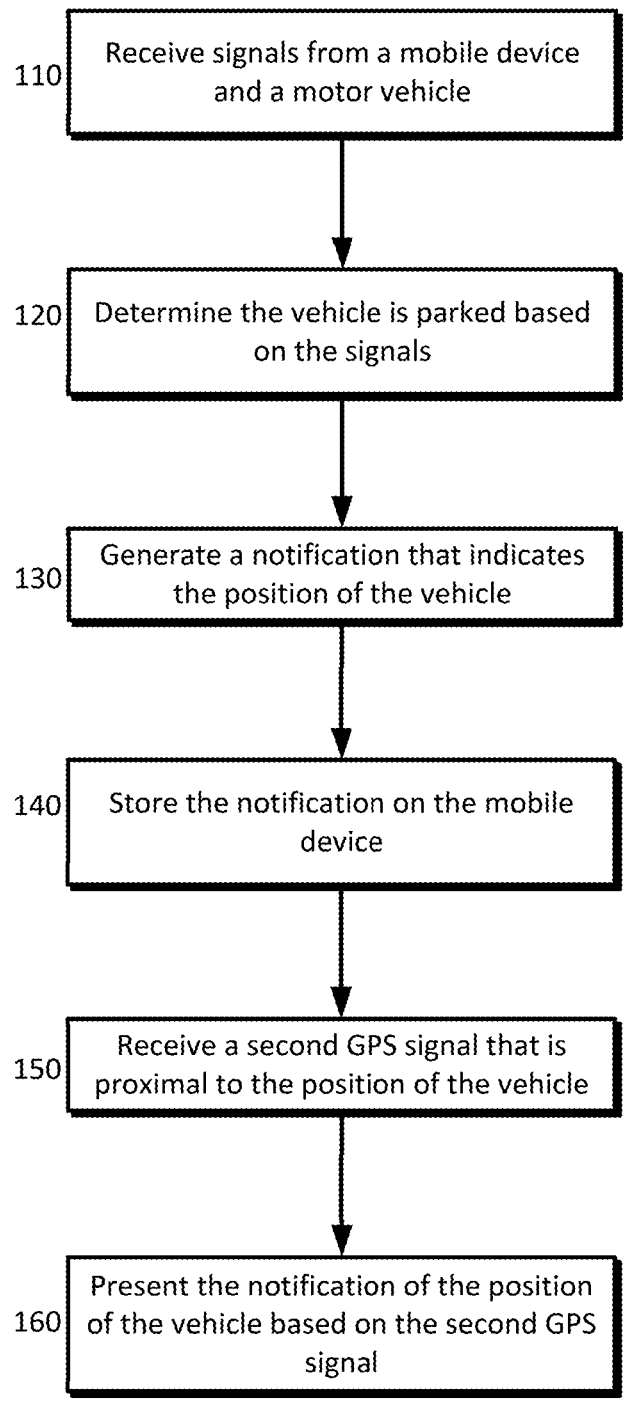
FIG. 1 shows an example process for providing a notification of where a user parked a vehicle as disclosed herein.

An example process for providing a notification of where a user parked a vehicle is provided in FIG. 1. A mobile device may receive one or more signals from the mobile device and/or a vehicle at 110. A mobile device may refer to a laptop, a tablet, a smartphone, etc. The mobile device may be connected to the vehicle by a wired (USB) or wireless protocol (e.g., Bluetooth). The mobile device may be a component of a projected architecture in which the mobile device drives the display of content on a display of an infotainment system of the vehicle. The mobile device may be disabled while it is in the projected architecture mode or connected to the vehicle to prevent driver distraction. For example, the touchscreen of the mobile device may not respond to touches while it is connected to the motor vehicle. The driver may interact with the display of the infotainment system when it is in a projected architecture, including using any buttons and/or knobs associated therewith, as one would operate a conventional infotainment system. Upon disconnecting the mobile device from the motor vehicle, such as by unplugging a USB cable from the mobile device, the mobile device may return to an unlocked state (e.g., normal operation when it is disconnected from the motor vehicle).

The signals received by the mobile device may include, for example, a GPS signal, a disconnect signal (e.g., unplugging a USB cable from the mobile device that connects it to the motor vehicle), a parking brake sensor, a seat weight sensor, a motion detector, accelerometer data and a speed sensor. The each signal may be weighted. For example, depending on a driving habit associated with the user whose mobile device is connected to the motor vehicle. One user may never utilize a parking brake when parking a vehicle while another user may consistently do so. In the former case, the parking brake sensor may receive low weight while the latter case may receive a greater weight. More than one signal may be utilized in determining whether or not the vehicle has been parked at 120.

A probability that the vehicle is parked may be determined based on the signals received from the vehicle and/or the mobile device. The probability may be utilized to determine that the vehicle is parked. For example, the system may determine that the parking brake is engaged, the vehicle is in park, and the mobile device has been disconnected from the vehicle. Each of these devices may be weighted as strong indicators that the vehicle is parked. A value may be associated with each signal received. The value may be multiplied by a weight value. Each value associated with each signal may be summed and, if the summed value exceeds a preset amount, the system may determine that the vehicle is likely to be parked. The mobile device may, upon determining that the device is likely parked based on the signals and/or the probability, generate a notification as described herein.

In some configurations, the system may utilize the occurrence of an event as the indication that the vehicle has been parked. One or more events may have been determined to have occurred. The events may be an indication that the user has parked the vehicle based on one or more of the signals described above. The events may include, for example, a gear sensor indicating that the vehicle in park, a disconnect signal being received that indicates the mobile device is no longer communicating with the motor vehicle, and/or that a first GPS signal is substantially identical to a second GPS signal. For example, a first GPS signal may be received at a time shortly after a user parks the vehicle and a second GPS signal may be received shortly after the user begins walking away from the vehicle. The first GPS signal may differ slightly from the second GPS signal. The first GPS signal and the second GPS signal may form a vehicle position. For example, the average of the latitude and longitude coordinates may be computed and stored to a computer readable memory of the mobile device. Likewise, a seat sensor may determine that a driver is no longer seated behind the wheel and/or that the passengers have left. A motion detector may be actuated by small movements of the driver and/or passengers until the car is parked and the occupants all leave the car.

A notification may be generated that indicates the position of the motor vehicle at 130. The notification may include an indication of a vehicle elevation based on the vehicle position (e.g., based on one or more GPS signals). As described above, the vehicle position may refer to two or more coordinates received from a GPS sensor that are substantially identical. The notification may be stored to a computer readable memory of the mobile device at 140. The notification may include a date and time stamp. The notification may also include a request shown to the user of the mobile device to confirm that the vehicle has been parked. A response from the user (e.g., indicating a parked or not parked condition) can be received by the system and stored. A user may annotate the notification to add text and/or an image. A prompt may be generated that requests permission to store the vehicle position and, in response to the prompt, the mobile device may store the vehicle position.

In some configurations, the notification may be stored for later viewing if the mobile device is determined to have deviated from the vehicle's position by a preset value. For example, a user may be determined to be 100 meters from the vehicle position based on a GPS signal obtained from the mobile device. The preset value may be 100 meters. Thus, when the user is 100 meters or more from the vehicle position, based on a comparison of the mobile device's current position and the vehicle position computed earlier, the mobile device may store the notification and/or establish a periodicity for its reappearance (e.g., constant, daily, hourly, etc.).

Subsequent to generating the notification, a second GPS signal may be received that indicates the mobile device is proximal to the position of the vehicle at 150 that was determined earlier. The position of the vehicle may be compared to GPS signals received subsequent to the vehicle being determined to be parked. Upon determining that the vehicle has parked at 120, the vehicle may, for example, wait to present the notification until the mobile device is determined to have deviated from the vehicle's position by a preset value. The notification may be presented based on receipt of the second GPS signal that indicates the mobile device is once again in proximity to the vehicle. The notification may include a visual display of a position on the mobile device relative to the vehicle's position. For example, the notification may be a map that shows the vehicle position and the mobile device's current position. As the mobile device's position changes, the device may update the map to reflect the change. The map may be displayed once the mobile device is within a preset proximity of the vehicle. In some instances, the notification may include an animation, such as an arrow, that indicates the direction of the user's vehicle and a distance thereto.

Figure 2:
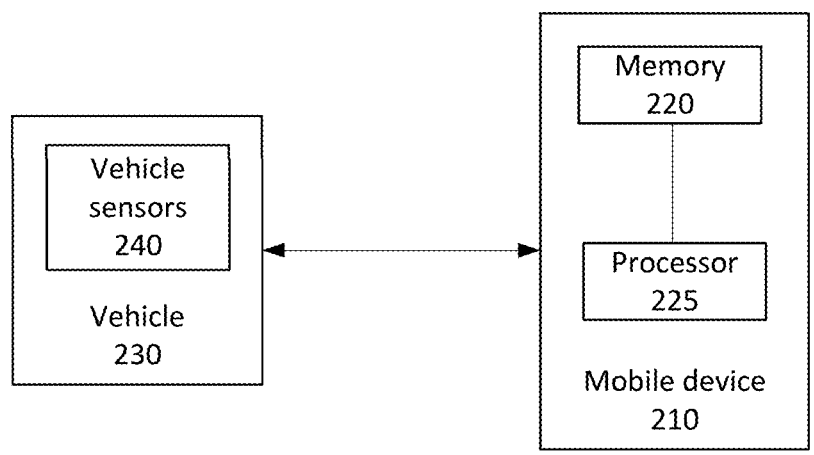
FIG. 2 is an example of a system for providing a notification of where a user parked a motor vehicle according to an implementation.

As shown in the example in FIG. 2, a system is disclosed that includes a computer readable memory 220 for storing an indication of one or more signals such as a GPS signal, a disconnect signal, and a gear sensor as described above. The system may include a processor 225 that is connected to the computer readable memory 220 that is configured to receive the one or more signals from the mobile device 210 and/or a motor vehicle 230. The processor 225 may be configured to determine that the vehicle 230 is parked based on the signals it has received as described earlier. The vehicle 230 may include one or more sensors that provide an indication of, for example, the status of the transmission gear, a brake position, etc. A position of the motor vehicle 230 may be determined based on the signals received. For example, the GPS data may indicate that the vehicle 230 has been in the same position for two minutes and the parking brake may be engaged. The processor 225 may generate a notification that indicates the position of the motor vehicle 230. The processor 225 may store the notification to the computer readable memory 220 of the mobile device 210. The processor 225 may receive a second GPS signal that is proximal to the vehicle position as described earlier. For example, the system may determine that the mobile device 210 is within 100 meters of the motor vehicle's previously determined position. The notification may be presented based on the receipt of the second GPS signal. For example, the being within 100 meters of the motor vehicle 230 may trigger presentation of the notification.

Figure 3:
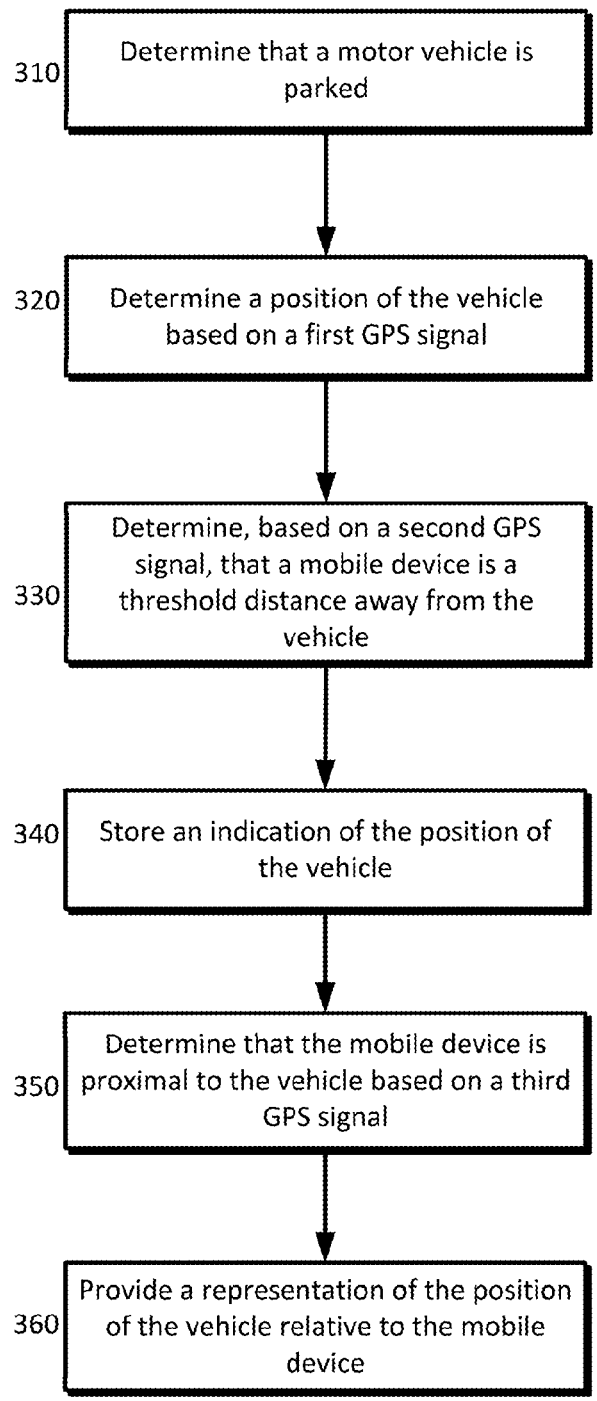
FIG. 3 is an example process for determining that a motor vehicle has been parked and subsequently that a mobile device is in proximity to the motor vehicle, thereby triggering presentation of the motor vehicle's location as disclosed herein.

In an implementation, an example of which is provided in FIG. 3, a motor vehicle may be determined to be parked based on at least a first GPS signal and a disconnect signal at 310. For example, the first GPS signal may refer to one or more GPS signals obtained by the mobile device prior to the disconnect signal being received. The mobile device may compare GPS signals that make up the first GPS signal to determine their similarity within a predefined time period. For example, if the GPS signals for the past minute are from substantially the same location, then it may indicate that the vehicle is parked, particularly when combined with a disconnect signal and/or other indications of the vehicle being parked as described earlier. The mobile device may be a component of a projected architecture system in which it is responsible for driving the display of an infotainment system integrated with the motor vehicle. The mobile device may be connected to the motor vehicle by a cable such as a USB cable.

A position of the motor vehicle may be determined based on the first GPS signal at 320. For example, at the time the disconnect signal was received, the mobile device may utilize one or more of the GPS signals received immediately prior to that signal to ascertain the vehicle location. The GPS sensor of the mobile device may continue to operate after the mobile device is separated from the motor vehicle. Based on a second GPS signal, it may be determined that the mobile device is a threshold distance away from the position of the motor vehicle at a first time reference at 330. As described earlier, once the mobile device is disconnected and the vehicle has been determined to be parked, the system may store an indication of the position of the motor vehicle at 340. The mobile device's subsequent GPS signals may be compared to the motor vehicle's position to determine when the mobile device is beyond a predefined threshold distance from the motor vehicle.

The mobile device may be determined to be proximal to the position of the motor vehicle based on a third GPS signal at a second time reference at 350. A representation of the position of the motor vehicle relative to the mobile device may be provided based on the first GPS signal and the third GPS signal. Thus, the first GPS signal may be utilized to determine that the vehicle is parked and the location of the vehicle. For example, a user may park a car at an airport. The second GPS signal may be utilized to determine when the user is beyond a threshold distance from the vehicle's parked location. For example, the user has walked 100 meters away from the vehicle's position. This may prompt the mobile device to store the position of the motor vehicle for later presentation. The third GPS signal may cause the mobile device to present a representation of the motor vehicle's representation (e.g., an arrow with distance, a map, a satellite view of the vehicle's location, an elevation, etc.). For example, when the user returns to the airport from a week-long vacation in a foreign country, the mobile device may display a representation of the user's motor vehicle.

One or more on-board or proximate sensors in communication with an on-board vehicle computer system may remain active. The on-board system may detect a change in condition indicated by data from one or more sensors that is inconsistent with a parked status of the vehicle. For example, the on-board system may receive indications from a motion detector of motion (e.g., of a person) in the vehicle, behind the steering wheel, in the passenger area of the vehicle, etc. Another sensor may report motion of the vehicle. Yet another sensor may report actuation of the vehicle's engine. A message can be sent to the mobile device based on the new sensor data. The message can include a request to the user to indicate if the user has returned to the car or has resumed operation of the car. The system can receive an indication from the user in response indicating that the user has returned to the car or has not returned to the car. If the system receives an indication that the user has not returned to the car, the system can provide an option to the user to contact law enforcement authorities. The user may turn on or off this feature by indicating "set alarm" before or after the vehicle is parked. Likewise, the user can disable this feature by indicating "disable alarm" or "cancel alarm" on the user device. Likewise, the feature can be automatically disabled when the user device is determined to have left a first threshold distance from the car and has returned to within a second threshold distance from the car. For example, the first threshold can be set at 20 feet so the alarm feature is automatically enabled when the user leaves the parked car and walks 500 feet to a store. The second threshold can be 100 feet and the alarm feature can be disabled when the user device is determined to be within that distance of the car as the user returns to the parked car. The first and second thresholds can be different or the same.

The alarm feature can also report other data to the user about the parked vehicle, such as the existence of high temperature (e.g., above a threshold that can be set by the user) in the cockpit or another location or locations in the car, such as the engine and in the trunk. It can report access to the trunk and the open or closed status of the trunk, along with timestamps associated with each change in condition. It can also report any motion of the car. The sensor data can be analyzed and messages can be shown to the user based on the results of the analyses. For example, a message can indicate that the parked vehicle is on fire, is being moved, is being occupied, that the trunk is being accessed and the like.

The alarm feature can be configured by the user. Types of sensors can be selectively enabled individually (e.g., cockpit temperature, motion detector, window status (open or closed), etc.) or in groups (fire detection sensor suite, theft sensor suite, etc.).

Figure 4:
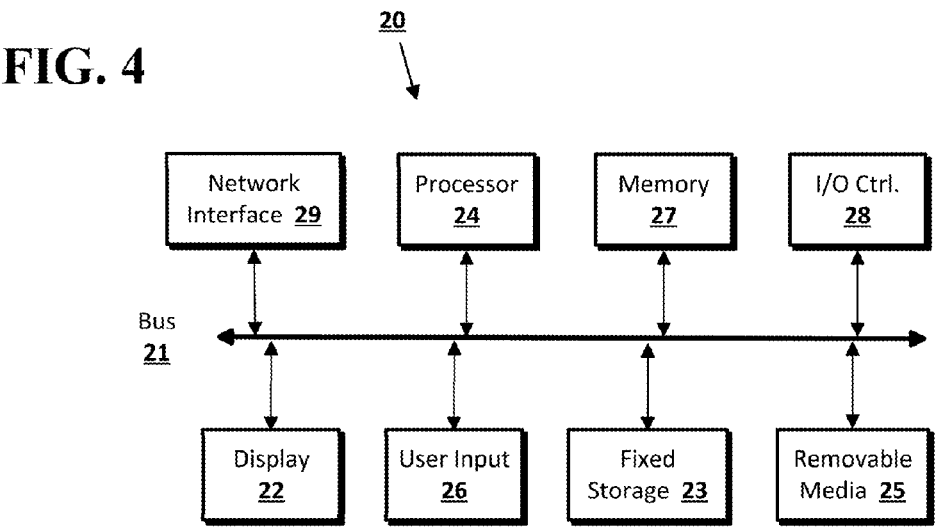
FIG. 4 shows a computer according to an implementation of the disclosed subject matter.

Implementations of the presently disclosed subject matter may be implemented in and used with a variety of component and network architectures. FIG. 4 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
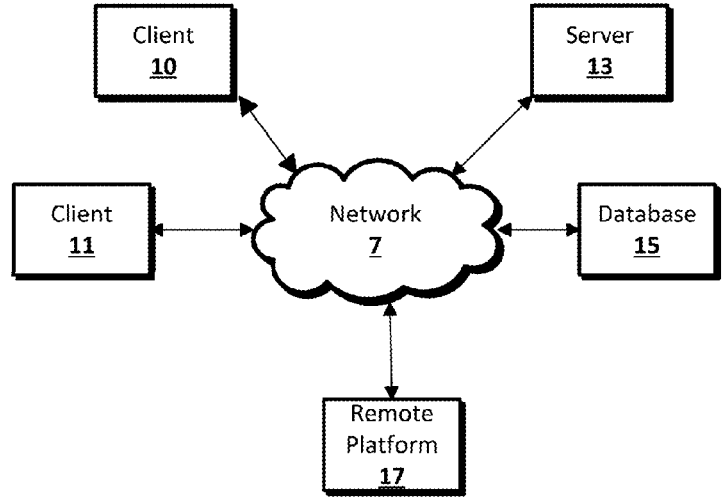
FIG. 5 shows a network configuration according to an implementation of the disclosed subject matter.

FIG. 5 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's provided input, a user's geographic location, and any other similar data associated with a user), or to control whether and/or how to receive data from a provider that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
   receiving, by a mobile device, a plurality of signals from the mobile device and a motor vehicle, wherein the mobile device is connected to the motor vehicle and wherein the plurality of signals comprise a GPS signal, a disconnect signal, and a gear sensor;
   generating a probability that the motor vehicle is parked based on the plurality of signals;
   determining that the motor vehicle is parked based on the probability;
   generating a notification that indicates a position of the motor vehicle based on the GPS signal;
   storing the notification on a computer readable memory of the mobile device;
   receiving a second GPS signal, wherein the second GPS signal is proximal to the position of the motor vehicle; and
   presenting the notification of the position of the motor vehicle based on the receipt of the second GPS signal.

2. The method of claim 1, wherein the plurality of signals comprises at least one of a parking brake sensor and a speed sensor.

3. The method of claim 1, further comprising comparing the position of the motor vehicle to the second GPS signal.

4. The method of claim 1, wherein the notification comprises an indication of a vehicle elevation based on the position of the motor vehicle.

5. The method of claim 1, further comprising:
   generating a prompt that requests permission to store the vehicle position; and
   receiving a response to the prompt directing the mobile device to store the position of the motor vehicle.

6. The method of claim 1, wherein the notification comprises a visual display of a position of the mobile device relative to the position of the motor vehicle.

7. The method of claim 1, wherein each of the plurality of signals is weighted.

8. The method of claim 1, further comprising determining the motor vehicle is parked.

9. A system, comprising:
   a computer readable memory for storing a plurality of signals from a mobile device and a motor vehicle, wherein the mobile device is connected to the motor vehicle and wherein the plurality of signals comprise a GPS signal, a disconnect signal, and a gear sensor;
   a processor connected to the computer readable memory, the processor configured to:
      receive, by the mobile device, the plurality of signals from the mobile device and the motor vehicle;
      generate a probability that the motor vehicle is parked based on the plurality of signals;
      determine that the motor vehicle is parked based on the probability;
      generate a notification that indicates a position of the motor vehicle based on the plurality of signals;
      store the notification on a computer readable memory of the mobile device;
      receive a second GPS signal, wherein the second GPS signal is proximal to vehicle position; and
      present the notification of the vehicle position based on the receipt of the second GPS signal.

10. The system of claim 9, wherein the plurality of signals comprises at least one of a parking brake sensor and a speed sensor.

11. The system of claim 9, the processor further configured to compare the vehicle position to the second GPS signal.

12. The system of claim 9, wherein the notification comprises an indication of a vehicle elevation based on the position of the motor vehicle.

13. The system of claim 9, the processor further configured to:
   generate a prompt that requests permission to store the vehicle position; and
   receive a response to the prompt directing the mobile device to store the position of the motor vehicle.

14. The system of claim 9, wherein the notification comprises a visual display of a position of the mobile device relative to the position of the motor vehicle.

15. The system of claim 9, wherein each of the plurality of signals is weighted.

16. The system of claim 9, the processor further configured to determine the motor vehicle is parked.

17. A computer-implemented method, comprising:
   generating a probability that a motor vehicle is parked based on at least a first GPS signal and a disconnect signal, wherein the first GPS signal and the disconnect signal are received by a mobile device that was connected to the infotainment system of a motor vehicle;
   determining that the motor vehicle is parked based on the probability;
   determining a position of the motor vehicle based on the first GPS signal;
   determining, based on a second GPS signal, that the mobile device is a threshold distance away from the position of the motor vehicle at a first time reference;
   storing an indication of the position of the motor vehicle;
   determining, based on a third GPS signal, that the mobile device is proximal to the position of the motor vehicle at a second time reference; and
   providing a representation of the position of the motor vehicle relative to the mobile device based on the first GPS signal and the third GPS signal.

* * * * *